Oct. 15, 1957  W. PACKARD  2,810,055
WINDSHIELD HEATER CONTROL DEVICE AND SYSTEM
Filed Dec. 20, 1954
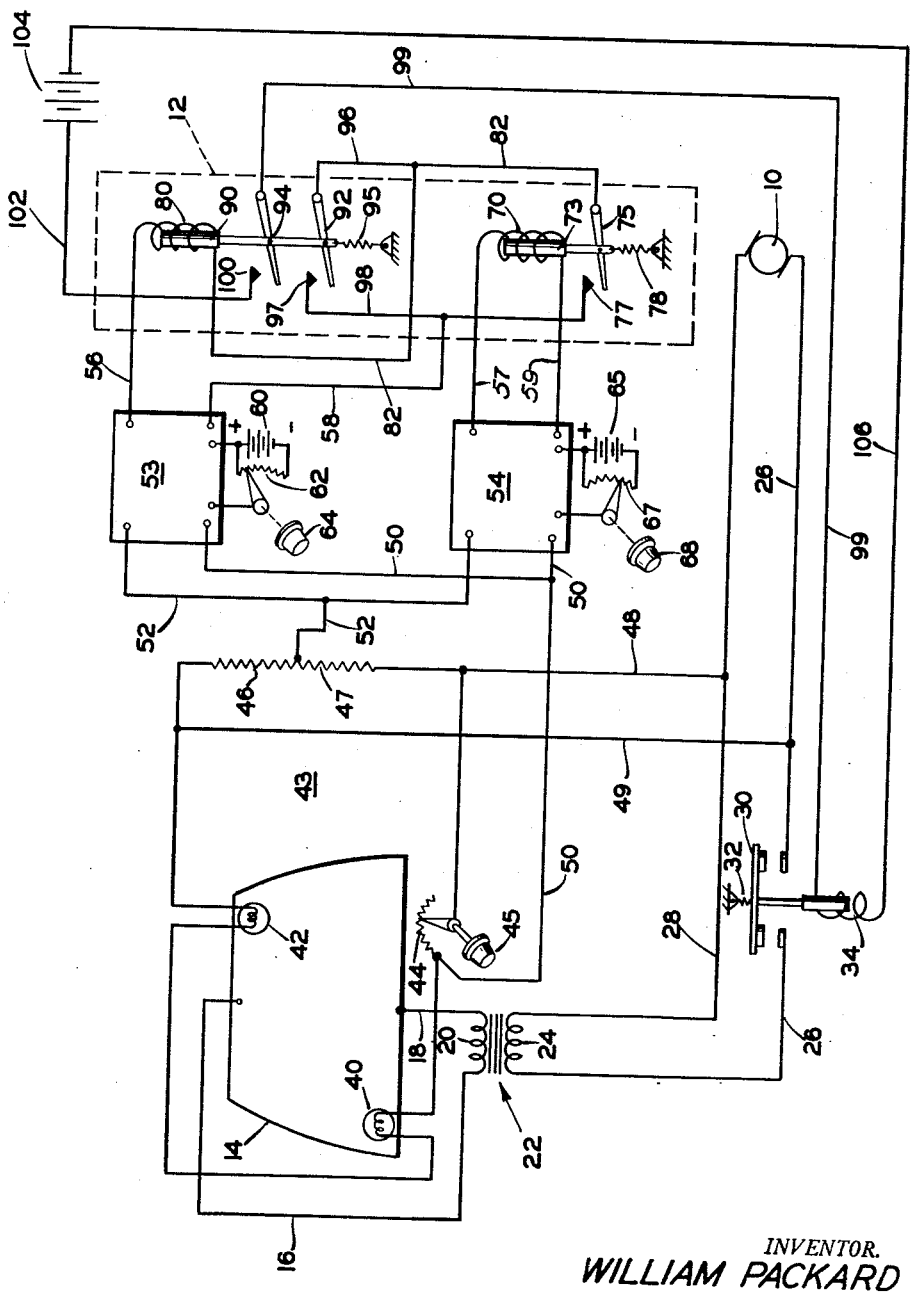
INVENTOR.
WILLIAM PACKARD
BY
Herbert L. Davis
ATTORNEY

United States Patent Office 2,810,055
Patented Oct. 15, 1957

2,810,055

WINDSHIELD HEATER CONTROL DEVICE AND SYSTEM

William Packard, Passaic, N. J., assignor to Bendix Aviation Corporation, Teterboro, N. J., a corporation of Delaware Application December 20, 1954, Serial No. 476,464

3 Claims. (Cl. 219—20)

The present application relates to improvements in a heater control system for a transparent panel or windshield of an aircraft to prevent fogging or icing thereon under varying flight conditions.

An object of the invention is to provide a novel relay arrangement to apply and remove electrical power impressed across an electrically conductive transparent panel or windshield of an aircraft so as to maintain it at some mean temperature to prevent fogging or icing and to provide operator-operative means to readily adjust the on-off temperature differential at which the electrical power will be applied and removed from the electrically conductive panel for the varying weather conditions encountered in flight of an aircraft.

Another object of the invention is to provide a novel system for controlling the application of electrical energy to a suitable heater element in a transparent panel or windshield of an aircraft so as to effect the removal and prevention of the accumulation of ice thereon and in which control system the electrical energy is disconnected from the heater element of the panel at a somewhat higher panel temperature than the temperature at which the electrical energy is connected to the heater element of the panel and in which there is further provided novel means for varying the temperature differential at which the electrical energy is connected to and disconnected from the heater element.

Another object of the invention is to provide a novel control system including a pair of relays, one of which initiates the application of electrical energy to a heater element in the transparent panel upon the panel temperature dropping below a first temperature value whereas the other relay cuts the energizing current off at a somewhat higher panel temperature value, together with means for adjusting the first and second mentioned temperature values independently one of the other.

The above and other objects and features of the invention will appear more fully hereinafter from a consideration of the following description taken in connection with the accompanying drawing wherein the invention is illustrated by way of example.

The drawing is a schematic diagram of the heater control system for the transparent panel or windshield of an aircraft showing the novel double relay control.

Referring to the drawing, there is indicated by the numeral 10 an alternator of suitable type and which may be driven by an aircraft engine as a source of power, and a double relay controller 12 which is arranged, as hereinafter explained, to control the output voltage applied by the alternator 10 to a heater for the transparent panel or windshield 14 of an aircraft.

The heater of the windshield 14 may be a transparent electrical conductive coating or resistor applied to the windshield 14 and may be of a type such as disclosed in U. S. Patent No. 2,644,065, granted June 30, 1953, to Joel D. Peterson, and assigned to Bendix Aviation Corporation, assignee of the present application.

The electrical conductive coating or heater, of the panel 14, is connected by conductors 16 and 18 to the secondary winding 20 of a step-up transformer 22. The transformer 22 has a primary winding 24 connected by conductors 26 and 28 to the output of the alternator 10. The conductor 26 is controlled by a main control relay switch 30 biased by a spring 32 to a normally open position and to a closed position by an electromagnetic winding 34, the energization of which is controlled by the double relay controller 12.

To control the temperature of the heater for the windshield 14, temperature sensing elements 40 and 42 made of a suitable temperature sensitive fine wire material having a positive temperature coefficient of resistance such as tungsten or nickel are embedded in the windshield panel 14 and may be of a type such as disclosed and claimed in the aforementioned U. S. Patent No. 2,644,065. The temperature sensing elements 40 and 42 serve to control the double relay controller 12 to determine the duty cycle of power from the alternator 10 to be applied to the heater resistor of the windshield 14 through the operation of the control system herein described.

The temperature sensing elements 40 and 42 are connected in series, as shown in the drawing, so as to provide one leg of a control bridge circuit 43, a non-thermal sensitive variable reference resistor 44 serves as another leg of the bridge. The variable resistor 44 may be conveniently adjusted by an operator-operative knob 45. The remaining legs of the bridge 43 are provided by fixed resistors 46 and 47.

The bridge circuit 43 is supplied with alternating current by the conductors 48 and 49 connected across the bridge 43 and leading from the output lines 26 and 28 from the alternator 10. The foregoing control system is broadly disclosed and claimed in the copending application Serial No. 68,594, filed December 31, 1948, by Joel D. Peterson and assigned to Bendix Aviation Corporation.

In the present improved control system output conductors 50 and 52 lead from the bridge 43 to the inputs of a pair of suitable amplifier and control circuits 53 and 54. In the improved control system, the control circuits 53 and 54 are responsive to an output signal from the same bridge circuit 43 which provides an output signal which increases in magnitude as the resistance elements 40 and 42 decrease with the temperature of the panel below the balance point of the bridge 43 set by the adjustment of the knob 45 until at a set-triggering point of the control circuit 53 and under panel temperature conditions below a set value determined by the setting or triggering point of the control circuit 53, a voltage is applied across the output lines 56 and 58 of the control circuit 53. The control circuit 54 has a triggering point set for a somewhat lower temperature value of the panel 14 so that under panel temperature conditions below such lower temperature value a voltage is applied across output lines 57 and 59 of the control circuit 54.

The specific structural details of the control circuits embodied in the boxes 53 and 54 are not claimed herein and the same may be of any suitable type such as amplifiers of the magnetic or electronic valve types with suitable discriminator or control circuits of conventional type having a triggering point or signal selector adjustable for example as by varying a suitable D. C. bias to be applied to the control circuit as is well known in the art.

In the control system illustrated, the triggering point of the control circuit in the box 53 is set by a D. C. bias applied thereto by a battery 60 across which there is connected a variable potentiometer 62 conveniently adjustable by an operator-operative knob 64, while the triggering point of the control circuit 54 is set by a D. C. bias applied thereto by a battery 65 through a variable potentiometer 67 conveniently adjustable by an operator-operative knob 68. Thus by adjustment of the knobs 64 and 68 the D. C. bias applied to the respective control circuits 53 and 54 may be adjusted so that the triggering points of the circuits may be set to take effect at different temperatures of the panel 14 and moreover the differential between such panel temperature values may be conveniently varied by the adjustment of the operator-operative knobs 64 and 68 under the varying fogging and icing conditions that may be encountered in flight of an aircraft.

*Double relay controller*

The preset triggering point of the control circuit 53 is set to take effect at a somewhat higher panel temperature than the preset triggering point of the control circuit 54. However, upon initial operation of the control when the panel or windshield 14 is cold, the thermal elements 40 and 42 will be at a lower resistance than the reference resistor 44 and this difference in resistance unbalances the bridge 43 and produces a large signal across the bridge output lines 50 and 52 leading to the input of the control circuits 53 and 54 and a signal of sufficient magnitude to exceed the triggering points of both control circuits 53 and 54 so that an energizing current flows through the output lines 57 and 59 from the control circuit 54 exciting the electromagnetic winding 70 of the double relay controller 12 and which winding 70 then magnetically actuates an armature 73 and relay switch arm 75 to close a contact 77 in opposition to the biasing force of a spring 78.

Upon the closing of contact 77 by relay switch arm 75, the voltage applied across lines 56—58 by the control circuit 53, as heretofore explained, causes an energizing current to flow through the output line 56 from the control circuit 53 and through electromagnetic winding 80, conductor 82 leading to switch arm 75, through switch arm 75, closed contact 77, and through the other output conductor 58 of the control circuit 53 leading to the contact 77 so as to cause energization of the electromagnetic winding 80 of the double relay controller 12. The winding 80 then magnetically actuates an armature 90 and relay switch arms 92 and 94 in opposition to the biasing force of a spring 95.

The relay switch arm 92 is connected by a conductor 96 to the conductor 82 and upon energization of the electromagnetic winding 80 closes a contact 97 connected by a conductor 98 to the conductor 58 so as to close a holding circuit for the electromagnetic winding 80. The relay switch arm 94 is connected by a conductor 99 to one terminal of the winding 34 of the main control relay 30. Upon energization of the winding 80, as heretofore described, the switch 94 closes a contact 100 connected by a conductor 102 to one terminal of a battery 104, the opposite terminal of the battery 104 being connected by a conductor 106 to the other terminal of the winding 34. Thus upon the closing of the contact 100 by the relay switch arm 94 the winding 34 is energized so as to magnetically actuate the main control relay switch 30 to a closed position effecting energization of the resistor heater of the panel or windshield 14 from the alternator 10 through the conductors 26 and 28 and the step-up transformer 22.

As the temperature of the panel or windshield 14 increases due to the application of heat thereto by the resistor heater, the signal output from the bridge 43 now diminishes to a preset triggering point for the control circuit 54 determined by the setting of the potentiometer 67 by the operator-operative knob 68 and at which point the D. C. bias applied by battery 65 to the control circuit 54 is sufficient to prevent further passage of current to energize the relay winding 70, whereupon the winding 70 is deenergized and the switch 75 is biased by spring 78 to a position opening contact 77.

However, since the holding circuit for the winding 80 has been heretofore effected through the closing of the switch arm 92, the switch arm 94 continues closed under the magnetic force of the winding 80 and energization of the resistor heater of the panel or windshield 14 continues increasing the temperature of the panel or windshield 14. The signal output from the bridge 43 diminishes still further with increase in the temperature of the panel or windshield 14 until the signal output from the bridge 43 has diminished to a preset triggering point for the control circuit 53 determined by the setting of the potentiometer 62 by the operator-operative knob 64 and at which point the D. C. bias applied by battery 60 to the control circuit 53 is sufficient to prevent further passage of current to energize relay winding 80, whereupon the winding 80 is deenergized and the switch arms 92 and 94 are biased by spring 95 to a position opening the contacts 97 and 100 and the holding circuit for winding 80 and the energizing circuit for the main control relay winding 34 whereupon the control switch 30 is biased to an open position by spring 32 and the resistor heater for the panel or windshield 14 is deenergized, at the temperature setting or triggering point of the control circuit 53.

However, upon the temperature of the panel or windshield 14 decreasing, energization of the winding 80 is not effected upon the temperature of the panel 14 dropping below only the triggering point of the control circuit 53, since the energizing circuit for the winding 80 will remain open due to the open position of both switch arms 75 and 94. However, upon the temperature of the panel 14 decreasing below that of the triggering point of the control circuit 54 winding 70 becomes energized closing switch arm 75 so as to permit the voltage applied across output lines 56—58 of the control circuit 53 to thereupon effect energization of the winding 80 and the closing of switch arm 92 and 94, as heretofore explained, and in turn effecting energization of the resistor heater for the panel 14.

Thus the setting of the triggering point for the control circuit 54 will determine the relatively low temperature at which the resistor heater for the panel 14 is brought into operation while the setting of the triggering point for the control circuit 53 will determine the somewhat higher temperature at which the resistor heater for panel 14 will be turned off.

Moreover by adjustment of the knobs 64 and 68 and thereby the triggering points for the respective control circuits 53 and 54, the differential between the temperatures at which the resistor heater may be turned on and off may be conveniently adjusted to suit the varying operating conditions encountered in flight of the aircraft.

Further, by convenient adjustment of the knob 45 and thereby the resistor 44 of the bridge 43 the operating point or temperature setting of the control may be varied by the operator so as to alter the control temperature of the panel or windshield 14 to suit the varying fogging and icing conditions which may be encountered.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A system for the elimination of ice from a windshield of an aircraft, comprising an electric heater element embodied in said windshield, a source of electrical energy for energizing said heater element, means for controlling the energization of said heater element including a variable resistance temperature sensitive element embedded in said windshield and responsive to the temperature appurtenant to said windshield, a first relay means, first means for operatively connecting said temperature sensitive element to said first relay means, said first relay means controlled by said temperature sensitive element upon the windshield temperature decreasing below a first predetermined value, a second relay means to control connection of said source of electrical energy to said heater element, second independent means for operatively connecting said temperature sensitive element to said second relay means, said second connecting means controlled by said first relay means and said temperature sensitive element so as to cause said second relay means to effect the energization of said heater element upon said windshield temperature decreasing below said first predetermined value, said second relay means including a holding relay means to prevent said second relay means from effecting deenergization of said heater element thereafter until the temperature of the winshield increases to a value in excess of a second and higher predetermined value.

2. For use in a system for controlling energization of an electric heating means for a transparent panel having a temperature sensitive means; a device comprising a first relay means, a second relay means including a first switch element operated thereby, first means for operatively connecting said temperature sensitive means to said first relay means, said connecting means including said first switch element adapted to cooperate with said temperature sensitive means so as to jointly control energization of said first relay means, second independent means for operatively connecting said temperature sensitive means to said second relay means so as to control energization of said second relay means, a third relay means to control energization of said electric heating means, a second switch element operated by said first relay means to control energization of said third relay means, said second independent connecting means permitting said temperature sensitive means to effect energization of said second relay means only under relatively low predetermined panel temperature values and effective to cause energization of the second relay means upon the panel temperature decreasing below a predetermined minimum temperature value, a third switch element operated by said first relay means and shunting said first switch element upon energization of said second relay means causing said first switch element to close effecting energization of said first relay means, said third switch element effecting a holding circuit for said first relay means and thereby maintain energization of said third relay means and said heating means upon the panel temperature exceeding said relatively low first predetermined panel temperature values, said first connecting means including means permitting said temperature sensitive means to effect energization of said first relay means at relatively higher second predetermined panel temperature values and effective to cause deenergization of said first relay means upon the panel temperature exceeding a predetermined maximum temperature value.

3. For use in a system for controlling energization of an electric heating means for a transparent panel having a temperature sensitive means; a device comprising a first relay means, a second relay means including a first switch element operated thereby, first means for operatively connecting said temperature sensitive means to said first relay means, said connecting means including said first switch element adapted to cooperate with said temperature sensitive means so as to jointly control energization of said first relay means, second independent means for operatively connecting said temperature sensitive means to said second relay means so as to control energization of said second relay means, a third relay means to control energization of said electric heating means, a second switch element operated by said first relay means to control energization of said third relay means, said second independent connecting means permitting said temperature sensitive means to effect energization of said second relay means only under relatively low predetermined panel temperature values and effective to cause energization of the second relay means upon the panel temperature decreasing below a predetermined minimum temperature value, a third switch element operated by said first relay means and shunting said first switch element upon energization of said second relay means causing said first switch element to close effecting energization of said first relay means, said third switch element effecting a holding circuit for said first relay means and thereby maintain energization of said third relay means and said heating means upon the panel temperature exceeding said relatively low first predetermined panel temperature values, said first connecting means including means permitting said temperature sensitive means to effect energization of said first relay means at relatively higher second predetermined panel temperature values and effective to cause deenergization of said first relay means upon the panel temperature exceeding a predetermined maximum temperature value, manually operable control means for adjusting said first connecting means so as to vary the predetermined maximum temperature value, and another manually operable control means for adjusting said second independent connecting means so as to vary the predetermined minimum temperature value.

References Cited in the file of this patent
UNITED STATES PATENTS

| | | |
|---|---|---|
| 2,600,313 | Mershon | June 10, 1952 |
| 2,610,797 | Miller | Sept. 16, 1952 |
| 2,701,292 | Lincoln | Feb. 1, 1955 |